United States Patent [19]

Castagnos, Jr. et al.

[11] 4,062,759
[45] Dec. 13, 1977

[54] FLUIDIZED CATALYTIC CRACKING REGENERATION PROCESS

[75] Inventors: Leonce F. Castagnos, Jr., Nederland; Roy E. Pratt, Groves, both of Tex.

[73] Assignee: Texaco Inc., New York, N.Y.

[21] Appl. No.: 684,338

[22] Filed: May 7, 1976

[51] Int. Cl.² .................. C10G 13/02; B01J 8/24; C01B 29/12
[52] U.S. Cl. .................. 208/113; 23/288 B; 208/120; 208/164; 252/417
[58] Field of Search ............ 208/113, 120; 252/416, 252/417

[56] References Cited

U.S. PATENT DOCUMENTS

| | | | |
|---|---|---|---|
| 3,494,858 | 2/1970 | Lucken Bach | 208/164 |
| 3,661,800 | 5/1972 | Pfeiffer et al. | 252/417 |
| 3,886,060 | 5/1975 | Owen | 208/120 |
| 3,893,812 | 7/1975 | Conner et al. | 23/288 B |
| 3,898,050 | 8/1975 | Strother | 23/288 B |
| 3,909,392 | 9/1975 | Horecky et al. | 208/120 |
| 3,926,778 | 12/1975 | Owen et al. | 208/74 |
| 3,926,843 | 12/1975 | Owen | 252/417 |

*Primary Examiner*—Delbert E. Gantz
*Assistant Examiner*—G. E. Schmitkons
*Attorney, Agent, or Firm*—Carl G. Ries; Thomas H. Whaley; Douglas H. May, Jr.

[57] ABSTRACT

A process is described herein for regeneration of spent, coke contaminated fluidized cracking catalyst by burning coke therefrom with a molecular oxygen containing regneration gas in a fluidized dense phase bed, and for burning substantially all carbon monoxide formed to carbon dioxide. A method is provided for establishing a homogeneous dense phase fluidized bed of catalyst undergoing regeneration. Additionally, a method is provided for transferring heat from a dilute phase back to the fluidized dense phase catalyst bed.

9 Claims, 1 Drawing Figure

U.S. Patent
Dec. 13, 1977
4,062,759
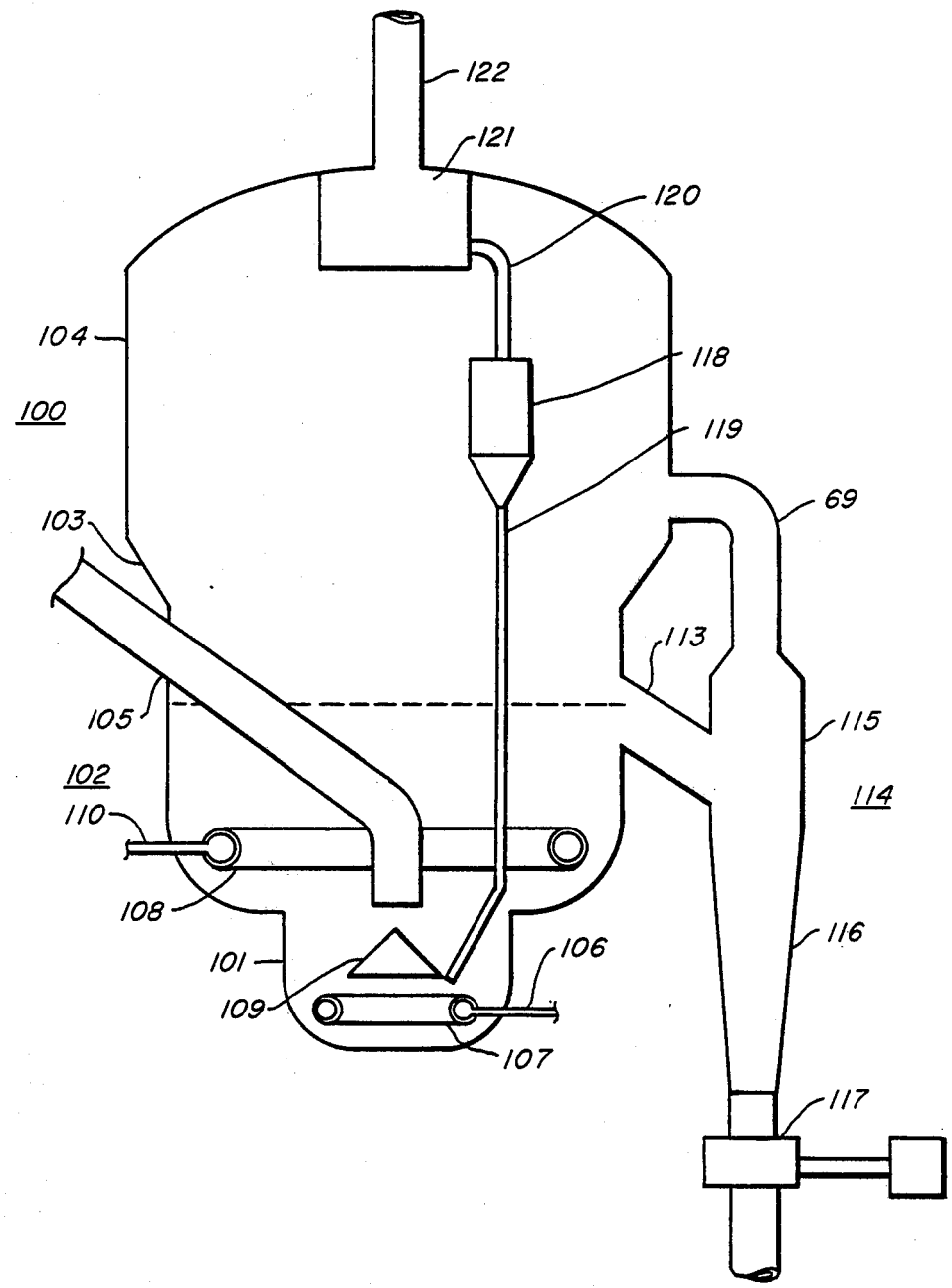

FLUIDIZED CATALYTIC CRACKING REGENERATION PROCESS

The present invention relates to fluidized catalytic cracking of hydrocarbons. In particular, the present invention relates to a method for regeneration of zeolitic molecular sieve containing fluidizable catalytic cracking catalyst.

Fluidized catalytic cracking processes are well known and widely practiced in petroleum refineries. Such processes comprise contacting a hydrocarbon charge with hot regenerated fluidized cracking catalyst in a reaction zone under cracking conditions for conversion of the hydrocarbon charge into cracked hydrocarbon products with the concomitant deposition of carbonaceous materials (coke) upon the catalyst; separating cracked hydrocarbon vapors from the coke-contaminated catalyst (spent catalyst) within the reaction zone; recovering as product the cracked hydrocarbon vapors essentially free of entrained catalyst; stripping, in a stripping zone, volatile hydrocarbons from the spent catalyst by contact with stripping vapors; regenerating, in a regeneration zone, the coke contaminated stripped catalyst by burning coke therefrom with a molecular oxygen containing regeneration gas at an elevated temperature for restoring activity to the regenerated catalyst; and contacting hot, regenerated catalyst with additional hydrocarbon charge in the reaction zone, as described above.

In fluidized catalytic cracking processes for conversion of normally liquid hydrocarbons, such as petroleum fractions, into lower boiling hydrocarbons, it is well known to employ catalysts comprising zeolitic aluminosilicate molecular sieves to obtain increased conversion of hydrocarbon charge into useful, lower boiling hydrocarbons, particularly into naphtha fractions useful as motor fuels. Such catalysts comprise an amorphous matrix such as silica-alumina, silica-magnesia, etc. containing a minor portion of a crystalline zeolytic aluminosilicate molecular sieve having uniform crystalline pore openings which has been ion exchanged with rare earth ions, magnesium ions, hydrogen ions, ammonium ions and/or other divalent and polyvalent ions for reduction of the sodium content of the molecular sieves to not more than one weight percent, and preferably less. These cracking catalysts (hereinafter referred to as "zeolite catalysts") are well-known and commercially available. The activity and selectivity of such zeolite catalysts for conversion of hydrocarbon charge stocks into useful cracked hydrocarbon products, particularly naphtha, are particularly affected by residual carbon remaining on regenerated catalyst. For obtaining the full utility and benefit of the activity and selectively of such zeolite catalysts, carbon on regenerated catalyst is maintained below 0.2 weight percent, and preferably 0.07 weight percent or less.

SUMMARY OF THE INVENTION

Now, according to the present invention, an improved process is disclosed for regeneration of spent, coke contaminated zeolite cracking catalyst by burning coke therefrom with a molecular oxygen containing regeneration gas to produce flue gas comprising oxides of carbon and regenerated catalyst containing 0.1 weight percent or less residual carbon.

According to a preferred embodiment of the present invention spent, coke-contaminated cracking catalyst, from a fluidized catalytic cracking zone wherein a hydrocarbon charge is cracked in the presence of hot, regenerated catalyst, having about 0.5-2.0 weight percent coke deposited thereon, at a temperature in the range of about 750°-1100° F, is transferred substantially vertically downward into the axial center of a vertical, cylindrical lower regeneration zone for intimate mixture with an oxygen containing primary regeneration gas, under turbulent flow conditions. The primary regeneration gas is charged into the lower regeneration zone radially at an angle downward from horizontal of about 30° to 60° at a nozzle exit velocity in the range of about 65-175 ft/sec, at a flow rate sufficient to provide about 25 to 40 percent of the stoichometric amount of oxygen required for combustion of the coke on spent catalyst to carbon dioxide and water. The spent catalyst-primary regeneration gas mixture flows upward in said lower regeneration zone, at a superficial vapor velocity in the range of about 4.5–8.0 ft/sec, for a catalyst residence time of about 1.0 second to 1 minute, for initiation of catalyst regeneration and for distribution of the spent catalyst-primary regeneration gas mixture across the cross-sectional area of the lower regeneration zone.

From the open top of the lower regeneration zone, the spent catalyst-primary regeneration gas mixture flows upward into the bottom of a vertical, cylindrical upper regeneration zone. In the upper regeneration zone, an oxygen containing secondary regeneration gas is injected at a flow rate sufficient to provide about 60 to 85 percent of the stoichometric amount of oxygen required for combustion of coke on spent catalyst to carbon dioxide and water, such that about 100 to 110 percent of the oxygen required for combustion of coke is supplied by primary and secondary regeneration gas to the regeneration process. The secondary regeneration gas flows radially into the bottom of the upper regeneration zone, such that regeneration gas, flowing upward at a superficial vapor velocity in the range of about 2.5–6 ft/sec, and catalyst undergoing regeneration forms a fluidized dense phase bed of catalyst having an upper surface above which is superimposed a dilute phase of catalyst suspended in spent regeneration gas. Within the upper regeneration zone, operating conditions including catalyst residence time in the dense phase bed in the range of about 3 to 20 minutes, regeneration temperatures in the range of about 1150°–1350° F and pressure at the top of the dense phase bed in the range of about 6–50 psig are maintained to provide a specific coke burning rate of about 0.05 to 1 pounds of coke per hour per pound of catalyst in the dense phase bed such that residual carbon on regenerated catalyst is reduced to about 0.1 wt. percent or less. Such regeneration operating conditions and the amount of oxygen supplied to the regeneration process may be adjusted within their respective ranges to obtain carbon on regenerated catalyst of 0.1 wt. percent or less, and preferably about 0.05 wt. percent or less, and to combust essentially all carbon monoxide formed from burning coke, to carbon dioxide.

From the upper portion of the fluidized dense phase catalyst bed in the upper regeneration zone, hot, regenerated catalyst is withdrawn into a deaeration zone located external to said upper regeneration zone wherein regeneration gas is separated from the regenerated catalyst forming a bed of hot, deaerated, regenerated catalyst superimposed by separated deaerated gas. The deaerated catalyst is transferred from the deaeration zone to the reaction zone for conversion of additional hydrocarbon charge stock. Regeneration gas separated from the deaerated catalyst is transferred to a dilute phase zone for admixture with the dilute phase of catalyst suspended in spent regeneration gas which is above the upper surface of the fluidized dense phase catalyst bed.

From the upper surface of the fluidized dense phase catalyst bed, spent regeneration gas, comprising carbon dioxide and carbon monoxide, substantially depleted in oxygen content, and having catalyst entrained therein, flows upward into a frusto-conic transition zone wherein spent regeneration gas superficial vapor velocity is reduced from about 2.5–6.0 ft/sec to about 1.0–2.2 ft/sec. such that a major portion of the entrained catalyst returns, under the influence of gravity to the fluidized dense phase catalyst bed. The spent regeneration gas with the minor portion of catalyst entrained therein as a dilute phase flows from the top of the transition zone into a dilute phase regeneration zone at a superficial vapor velocity of 1.0–2.2 ft/sec. The ratio of carbon dioxide to carbon monoxide in the spent regeneration gas is in the range of about 1:1 to about 500:1 or greater. Additional carbon monoxide may be combusted in the regeneration process, thus aleviating a pollution hazard by increasing the amount of oxygen supplied to the fluidized dense phase catalyst bed. Such additional oxygen may result in carbon monoxide combustion within the transition zone. A substantial portion of the heat of such carbon monoxide combustion is absorbed by the entrained catalyst, and is returned to the fluidized dense phase bed such that the dilute phase temperature does not exceed a temperature (about 1500° F and preferably 1450° F) at which the catalyst is seriously deactivated.

The dilute phase, having a superficial vapor velocity of about 1.0–2.2 ft/sec and a temperature in the range of 1150°–1450° F., flows from the dilute phase regeneration zone into a catalyst-gas separation zone wherein entrained catalyst is essentially completely separated from the spent regeneration gas. The spent regeneration gas is transferred from the catalyst-gas separation zone and the regeneration process as flue gas. The hot, separated catalyst from the catalyst-gas separation zone is transferred to the lower regeneration zone for contact with additional spent catalyst and primary regeneration gas for transfer of heat thereto, thus enhancing the initiation of catalyst regeneration.

Advantages of the improved regeneration process of the present invention include regeneration of spent zeolitic cracking catalyst to provide a regenerated catalyst having less than 0.1 weight percent residual carbon thereon, and to produce a flue gas substantially free of carbon monoxide. These and other advantages will be further discussed in the Detailed Description of the Invention, which follows.

BRIEF DESCRIPTION OF THE DRAWING

The Drawing is a schematic representation of fluidized catalyst regeneration process equipment embodying improvements of the present invention.

DETAILED DESCRIPTION OF THE DRAWING

In order to demonstrate and provide a better understanding of the invention, reference is now made to the Drawing. The Drawing is a schematic representation of fluidized catalytic cracking regeneration apparatus embodying improvements of the present invention. It is to be understood that the Drawing is only in such detail as required for a clear understanding of the present invention, and that various elements commonly employed in commercial apparatus, such as valves, pumps, instrumentations, etc. which are unnecessary for a description of the present invention have been omitted for the sake of clarity.

In the Drawing, fluidized cracking catalyst regeneration apparatus is shown, including a vertical regeneration vessel 100 comprising a lower regeneration section 101 which comprises a hollow cylinder having a closed bottom and an open top; an upper regeneration section 102 comprising a hollow cylinder having an axial centered opening in the bottom, and an open top, wherein the open top of said lower regeneration section 101 is in open communication with the bottom opening of said upper regeneration section 102; an open ended frusto-conic transition section 103, the bottom of which is in axial alignment and in communication with the open top of upper regeneration section 102; and a dilute phase regeneration section 104, comprising a hollow cylinder having a closed top and an open bottom in axial alignment and in communication with the open top of said transition section 103. The internal cross-section area of lower regenerator section 101 is sufficient to provide a regeneration gas superficial vapor velocity in the range of about 4.5–8.0 ft/sec., and the volume of lower regenerator section 101 is sufficient to provide a catalyst residence time of from about 10 seconds to about one minute at flow rates and operating conditions contemplated herein. The internal cross-section area of upper regeneration section 102 is sufficient to provide a regeneration gas superficial vapor velocity in the range of about 2.5–6.0 ft/sec, and the volume of upper regeneration section 102 is sufficient to provide a dense phase fluidized catalyst residence time of from about 3 minutes to about 20 minutes at flow rates and operating conditions contemplated herein. The walls of transition section 103 have a conic angle of about 20°–40° from the vertical and have sufficient height such that the increased cross-sectional area of the top of transition section 103 is sufficient for reducing the superficial vapor velocity of regeneration gas flowing therethrough from the range of about 2.5–6.0 ft/sec. to the range of about 1.0–2.2 ft/sec. Dilute phase regeneration section 104 is of the same diameter and cross-section area as the top of transition section 103.

In the Drawing, a spent catalyst conduit means 105 for introducing spent, coke-contaminated catalyst from a reaction section (not shown) substantially vertically downward into regenerator vessel 100 comprises a spent catalyst conduit directed downward at an angle of about 30° to 45° from the vertical, having a discharge end directed substantially vertically downward. Said spent catalyst conduit 105 passes through the side wall of upper regenerator section 102 and the lower, discharge end of said spent catalyst conduit 105 is directed substantially vertically downward into the axial center of lower regenerator section 101. The open discharge of spent catalyst conduit 105 terminates above a spent catalyst distribution means 109 which comprises a conical member having an upward facing apex, and having a base diameter equivalent to about ½ to 1½ spent catalyst conduit 105 diameters. Spent catalyst distribution means 109 is axially centered within lower regenerator section 101. Spent catalyst from the reaction section (not shown) flows downwardly through spent catalyst conduit 105 and discharges vertically downward, striking spent catalyst distribution means 109 for radial distribution into lower regenerator section 101.

In the Drawing, a primary regeneration gas conduit 106 passes into lower regenerator section 101 as means for introducing a molecular oxygen containing primary regeneration gas, e.g. air, into regenerator vessel 100. The discharge end of primary regeneration gas conduit 106 is in communication with a primary regeneration gas distribution means 107 which comprises a pipe forming a ring having a plurality of openings directed downward at an angle within the range of about 30° to 60° from the horizontal for radially distributing primary regeneration gas within the bottom of lower regenerator section 101. The total cross-sectional area of the plurality of openings in primary regeneration gas distribution means 107 is sufficient to provide a primary regeneration gas discharge velocity in the range of about 65–175 ft/sec. when said primary regeneration gas flow rate is sufficient to provide about 25 to 40 percent of the molecular oxygen required for conversion of coke on spent catalyst to carbon dioxide and water, such that spent catalyst from spent catalyst conduit means 105, and primary regeneration gas from primary regeneration gas distribution means 107 are intimately mixed and radially distributed within the bottom of lower regenerator section 101.

In the Drawing, a secondary regeneration gas conduit 110 passes into the lower portion of upper regenerator section 101 as means for supplying a secondary regeneration gas comprising molecular oxygen, e.g., air, to a secondary gas distributor 108. Secondary gas distributor 108 comprises a pipe forming a ring having a plurality of openings directed downward at an angle within the range of about 30° to 60° from the horizontal for radially distributing secondary regeneration gas within the bottom of upper regenerator section 102. The total cross-sectional area of said openings in secondary gas distributor 108 is sufficient to provide a secondary regeneration gas discharge velocity in the range of about 65–175 ft. per sec.

The flow rate of said secondary regeneration gas is sufficient to provide about 60 to 85 percent of the molecular oxygen required for conversion of the coke on spent catalyst to carbon dioxide and water.

In the drawing, upper regenerator section 102 has a cross-sectional area sufficient to provide for a superficial vapor velocity of regeneration gas flowing therethrough in the range of about 2.5 to 6.0 ft/sec., such that spent catalyst undergoing regeneration and regeneration gas form a fluidized dense phase bed of catalyst. The volume of upper regenerator section 102 is sufficient to provide an average residence time of about 3 to 20 minutes for spent catalyst in the fluidized dense phase bed, such that substantially all the coke may be burned therefrom at a specific coke burning rate within the range of about 0.05 to 1 pounds of coke per hour per pound of catalyst in the fluidized dense phase catalyst bed, at regeneration temperatures within the range of about 1150° to 1350° F.

In the Drawing, a regenerated catalyst ductway 113 communicates between the upper portion of upper regenerator section 102 and an external regenerated catalyst standpipe 114. Regenerated catalyst ductway 113 is inclined at an angle in the range of about 30° to 60° from the vertical such that regenerated catalyst from the upper portion of the fluidized dense phase catalyst bed maintained in upper regenerator section 102 will flow downwardly through regenerated catalyst ductway 113 into the upper portion of external regenerated catalyst standpipe 114. Regenerated catalyst standpipe 114 comprises an upper vertical cylindrical section 115 having a cylinder wall, an open top and an open bottom and a lower frusto-conic section 116 having an open top and open bottom. Communication of regenerated catalyst ductway 113 with upper standpipe section 115 is through said vertical cylinder wall. The open top of lower standpipe section 116 is in communication with the open bottom of upper standpipe section 115, and the walls of lower standpipe section 116 preferably have a conical angle of about $7\frac{1}{2}°$ from the vertical. Within said lower standpipe section 116 hot regenerated catalyst from regenerator vessel 100 is deaerated. A slide valve 117, in communication with the bottom of lower standpipe section 116 allows withdrawal of hot, deaerated, regenerated catalyst at a controlled rate for contact with a hydrocarbon charge stock in a fluidized catalytic cracking reaction section (not shown).

In the Drawing, gas entering regenerated catalyst standpipe 114 with regenerated catalyst from reactor vessel 100, accumulates in upper standpipe section 115. A deaeration gas conduit 69 is in communication with the open top of upper standpipe section 115 and dilute phase regenerator section 104 for removing such accumulated deaeration gas from regenerated catalyst standpipe 114 to the upper portion of reactor vessel 100.

In the Drawing, as previously stated, the open top of upper regenerator section 102 is in communication with the open bottom of transition section 103, for allowing flow of regeneration gas and entrained catalyst from the upper surface of the fluidized dense phase catalyst bed maintained in upper regenerator section 101 into dilute phase regenerator section 104 wherein a dilute phase of catalyst suspended in regeneration gas is maintained.

In the Drawing, the open top of regenerator transition section 103 is in communication with the open bottom of dilute phase regenerator section 104 for flow of regeneration gas and entrained catalyst into the dilute catalyst phase maintained in dilute phase regenerator section 104. The cross-sectional area of dilute phase regenerator section 104 is such that the superficial vapor velocity of gas flowing therethrough is in the range of about 1.0 to 2.2 ft. per second. Within dilute phase regenerator section 104, catalyst-gas separation means 118, preferably cyclone separators, are provided for separating entrained catalyst from spent regeneration gas. Within the present invention, it is contemplated that catalyst-gas separation means 118 may comprise one or more cyclone separators in series and/or parallel arrangement for substantially completely separating the entrained catalyst from the spent regeneration gas. For the purposes of clarity, only one separator 118 is shown. Line 119, in communication with the bottom of separator 118 extends downward into the lower regenerator section 101, terminating at about the point spent catalyst discharges from spent catalyst distributor 105. Entrained catalyst, separated from spent regeneration gas in separator 118 flows downward at regeneration temperature through line 119 and discharges into the bottom of lower regenerator section 101 wherein the hot separated catalyst mixes with spent catalyst and primary regeneration gas, increasing the temperature thereof and improving the initiation of coke burning on the spent catalyst.

In the Drawing, Line 120 communicates with the top of separator 118 and a plenum chamber 121. Plenum chamber 121 is attached to the top of regenerator vessel 100. Spent regeneration gas, essentially completely separated from entrained catalyst in catalyst-gas separator 118 flows through line 120 into plenum chamber 121. A vent line 122 communicating with plenum chamber 121 provides means for removing spent regeneration gas from regenerator vessel 100 as a flue gas.

Fluidized catalytic cracking units employing the improved regeneration process of the present invention are operated for the conversion of hydrocarbon charge stock into lower boiling cracked hydrocarbons and coke. Such conversion of hydrocarbon charge is accomplished by contacting hydrocarbon charge with hot regenerated catalyst under cracking conditions in a fluidized catalytic cracking reaction zone. Hydrocarbon charge and regenerated catalyst may be contacted in a riser transport reactor, in a reactor vessel containing a dense phase fluidized bed of catalyst fluidized by the up-flowing hydrocarbon charge vapors, or in a reactor zone comprising both a riser transport zone and a dense phase catalyst bed. Reaction conditions for conversion of hydrocarbon charge include reaction temperatures in the range of about 850°–1100° F, reaction pressures in the range of 5–50 psig or higher, regenerated catalyst to hydrocarbon charge weight ratios (catalyst/oil ratios) of from about 2:1 to about 20:1, catalyst and hydrocarbon contact times of from about 10 seconds to about 5 minutes, and reactor superficial vapor velocities in the range of 0.8 to 3.0 ft/sec. In such a fluidized catalytic cracking process, hydrocarbon charge and hot regenerated catalyst are contacted at such reaction conditions for conversion of the hydrocarbon charge into lower molecular weight hydrocarbons. A substantial portion of the hydrocarbons in contact with the catalyst are in vapor phase with a minor portion being present as liquid or solid phase. Such solid and liquid hydrocarbons collect upon the catalyst particles, resulting in a decrease of catalyst activity. Catalyst containing such hydrocarbons is referred to as spent catalyst. In such a fluidized catalytic cracking process, spent catalyst is treated for removal of such accumulated hydrocarbons and for regeneration of cracking activity. From the reaction zone of a fluidized catalytic process, spent catalyst containing accumulated hydrocarbons is commonly transferred to a stripping zone wherein the spent catalyst is contacted with a stripping vapor (e.g. steam) at a temperature in the range of about 750–1100° F for vaporization of at least a portion of the volatile hydrocarbons accumulated upon the catalyst. Volatilized hydrocarbons and stripping vapors are transferred from the stripping zone to the reaction zone. Stripped catalyst containing non-volatile hydrocarbon residues (commonly referred to as coke), is transferred to a regeneration zone wherein catalytic activity is restored to said catalyst by burning such coke from the catalyst with a molecular oxygen containing regeneration gas at an elevated temperature. Upon regeneration, hot regenerated catalyst, having restored activity, is transferred from the regeneration zone for contact with additional hydrocarbon charge in the reaction zone, as described above.

Catalysts, the regeneration of which the regeneration process of the present invention is well suited, include those catalyst commonly referred to as "zeolite" or "molecular sieve" cracking catalysts. Such catalyst will be referred to herein as zeolite catalyst for convenience in the discussion which follows. Such zeolite catalysts comprise about 95–85 wt.% amorphous refractory metal oxide matrix, and about 5–15 wt.% (preferably 8–10 wt.%) crystalline aluminosilicate zeolitic molecular sieves, having uniform crystalline pore openings, dispersed within said matrix. Said matrix generally has substantial cracking activity and is selected from naturally occuring clays, and synthetic oxide mixtures such as silica-alumina, silica magnesia, silica-zirconia, etc. The zeolite portion of such zeolite cracking catalyst comprises small particles of either natural or synthetic crystalline, alumino-silicate zeolitic molecular sieves, such as faujasite, chabazite, X-type or Y-type alumino-silicate materials, etc., having a major portion of their sodium content replaced by ion exchange with magnesium ions, rare earth ions, ammonium ions, hydrogen ions, and/or other divalent and polyvalent ions which enhance the catalyst activity. The apparatus of the present invention is particularly well suited for use in regenerating those zeolite cracking catalysts promoted for increasing the rate of burning carbon monoxide to carbon dioxide within the regeneration zone. Such promoted zeolite catalysts may have controlled pore size, and contain small amounts of material such as platinum, nickel, iron and other materials which catalyze the combustion of carbon monoxide to carbon dioxide at temperature commonly employed in the regeneration of catalytic cracking catalyst.

Spent cracking catalyst, when transferred to a regeneration zone, such as described herein, contain from about 0.5 weight percent to about 2.0 weight percent coke. In regenerating such spent catalyst, wherein the coke is burned from the catalyst to restore catalytic activity thereto, zeolite catalyst may be subjected to temperatures somewhat above 1325° F without substantially degrading their catalytic activity. At temperatures above about 1500° F, the structure and/or composition of the catalyst is affected in such a way that the catalyst irreversably losses at least a portion of its catalytic activity.

Regeneration of catalyst in the fluidized catalytic cracking process of the present invention comprises burning coke therefrom at an elevated temperature with a molecular oxygen containing regeneration gas. Generally, the regeneration gas is air, although other regeneration gases containing molecular oxygen, such as oxygen enriched air, steam and air mixtures, etc. may also be employed. The degree of regeneration of catalytic activity of a spent cracking catalyst is proportional to the degree of removal of coke from said catalyst. Lower residual carbon content of regenerated catalyst results in higher regenerated catalyst activity. The regenerated catalytic activity of zeolite cracking catalyst appears to be somewhat more sensitive to residual carbon than the regenerated activity of an amorphous cracking catalyst. Preferably, residual carbon content of regenerated catalyst is reduced to about 0.1 weight percent or less.

Hydrocarbon charge stocks within contemplation of the present invention are those which may be cracked to yield useful lower molecular weight hydrocarbon products. Examples of hydrocarbon charge stocks include virgin gas-oils, vacuum gas oils, atmospheric residua, topped crudes, shale oils, tar sand oils, virgin naphthas, and cycle oil and cracked naphtha recycle streams from cracking processes. A portion of all such hydrocarbon charge stocks when subjected to fluidized catalytic cracking are converted into coke. The portion of hydrocarbon charge stock which is converted into coke is proportional to the boiling range of the particular charge stock, and will vary from about 1 weight percent for some naphthas to about 15 weight percent or more for some residua.

In a process employing the improvements of the present invention, spent cracking catalyst containing about 0.5 to 2.0 weight percent coke is transferred vertically downward through spent catalyst distribution means 105 into the axial center of a first regeneration zone maintained in lower regenerator section 101. Such downward flowing spent catalyst is contacted with a primary regeneration gas flowing radially into said first regeneration zone, under turbulent flow conditions, for intimately mixing said spent catalyst and regeneration gas, and evenly distributing the resulting mixture across the cross-sectional area of said first regeneration zone. Primary regeneration gas is supplied to the first regeneration zone via primary gas distributing means 107 in an amount sufficient to provide about 25 to 40% of the stoichometric amount of molecular oxygen required for complete combustion of coke on spent catalyst to carbon dioxide and water. Spent catalyst entering said first regeneration zone is at a temperature in the range of about 750°-1100° F, and primary regeneration gas entering the first regeneration zone is at a temperature in the range of about 100°-600° F, such that combustion of coke upon spent catalyst is initiated. Residence time of spent catalyst in said first regeneration zone is sufficient for obtaining even distribution of spent catalyst and primary regeneration gas across the cross-sectional area of the lower regenerator section 101, and is in the range of about 1.0 seconds to 1 minute. From said first regeneration zone spent catalyst and regeneration gas flow upwardly into a second regeneration zone maintained in the upper regenerator section 102. Secondary regeneration gas, containing molecular oxygen, is radially distributed into the lower portion of said second regeneration zone, via secondary regeneration gas distribution means 110. The rate of secondary regeneration gas flow is sufficient such that the total oxygen in regeneration gas is equivalent to 100 to 110 percent of the stoichometric oxygen required for combustion of coke to carbon monoxide and water. In said secondary regeneration zone, operating conditions are maintained such that a dense phase bed of catalyst undergoing regeneration is fluidized by the upward flow of regeneration gas, and wherein substantially all the coke is burned from the catalyst undergoing regeneration. In the second regeneration zone the phase fluidized bed of catalyst has a density in the range of about 20–30 pounds per cubic foot and has an upper surface above which is superimposed a dilute phase of catalyst suspended in regeneration gas. Operating conditions within the second regeneration zone for maintaining the fluidized dense catalyst phase bed and for obtaining the degree of regeneration desired, include regeneration temperatures in the range of about 1050°-1350° F, regeneration pressures at the top of the dense phase catalyst bed in the range of about 6–50 psig, regeneration gas superficial vapor velocity upward through the dense phase bed in the range of about 2.5 to 6.0 ft/sec, catalyst residence time in the dense phase bed in the range of 3–20 minutes, and a specific coke burning rate, based upon the inventory of catalyst in the dense phase bed, in the range of about 0.05 to 1.0 pounds of coke per hour per pound of catalyst. Under these regeneration conditions, residual carbon on regenerated catalyst may be reduced to 0.1 weight percent or preferably 0.05 weight percent or less.

In the present invention, distribution of primary regeneration gas and catalyst into the first regeneration zone is such as to produce an intimate mixture of spent catalyst and a primary regeneration gas which flows upward into the bottom of the second regeneration zone. Regenerated catalyst is withdrawn from the upper portion of the second regeneration zone near the upper surface of the fluidized catalyst bed via regenerated catalyst ductway 113 which does not have projections which may impede the smooth flow of catalyst and vapors within the fluidized dense phase catalyst bed. Regenerated catalyst from said regenerated catalyst ductway 113 flows into a regenerated catalyst standpipe 114, located external to the second regeneration zone, wherein regenerated catalyst disengages regeneration gas entrained therein to form a deaerated bed of regenerated catalyst in the lower standpipe section 116. Hot regenerated catalyst is transferred from the lower standpipe section 116 for contact with additional hydrocarbon charge stock in the reaction zone of the fluidized catalytic cracking process. Regeneration gas separated from the regenerated catalyst flows from the upper standpipe section 115 into the dilute catalyst phase which superimposes the dense phase fluidized catalyst bed, via line 69.

In the present invention, regeneration gas comprising nitrogen, carbon dioxide, carbon monoxide, and substantially spent in molecular oxygen, with a small amount of catalyst entrained therein, disengages the upper surface of the fluidized dense phase catalyst bed and enters a transition zone wherein the cross-sectional area is increased such that the superficial vapor velocity of the spent regeneration gas decreases to a value in the range of 1.0 to about 2.2 ft/sec. Upon decreasing the superficial vapor velocity of spent regeneration gas within the transition zone, substantial amounts of entrained catalyst return, under the influence of gravity, to the top of the dense phase fluidized catalyst bed. Spent regeneration gas from the top of said transition zone forms a dilute phase having a small amount of catalyst suspended therein. This dilute phase having a density of about 0.1 to 1.0 lb/cu. ft enters the bottom of a dilute phase regeneration zone. The ratio of carbon dioxide to carbon monoxide with spent regeneration gas of the dilute phase may vary from about 1:1 to about 500 to 1 or greater depending upon operating conditions within said fluidized dense phase catalyst bed. As carbon monoxide is a serious air pollutant, it is desirable that as much as possible be burned to carbon dioxide within regeneration vessel 100. With unpromoted zeolite cracking catalyst, increased temperatures in the regeneration zone dense phase result in increased combustion of carbon monoxide to carbon dioxide such that at about 1350° F the carbon monoxide content of spent regeneration gas will be less than 1 percent by weight and preferably is less than about 200 parts per million weight (ppmw) under regeneration conditions employed herein. When catalyst promoted for combustion of carbon monoxide to carbon dioxide is employed, essentially complete combustion of carbon monoxide to carbon dioxide may be obtained at substantially lower temperatures in the range of about 1250° F. In the event that combustion of carbon monoxide in the dense phase fluidized bed is incomplete and substantial amounts of carbon monoxide are present in spent regeneration gas entering the transition zone, additional secondary regeneration gas, sufficient to provide from about 1 to about 10 mole percent excess oxygen over the stoichometric amount of oxygen required for complete combustion of the coke on spent catalyst, is introduced into the second regeneration zone via secondary regeneration gas distribution means 110. This additional oxygen injected into the fluidized dense phase enables substantial combustion of carbon monoxide to carbon dioxide in said fluidized dense phase. Additionally, excess oxygen in the spent regeneration gas of the transition zone and the dilute phase regeneration zone results in additional combustion of carbon monoxide to carbon dioxide. The portion of catalyst entrained in the spent regeneration gas which falls back to the upper surface of the dense phase fluidized catalyst bed from the transition zone under the influence of gravity, carries a substantial amount of the heat generated from the combustion of carbon monoxide to carbon dioxide in the transition zone back to the dense phase fluidized catalyst bed, such that the temperature of the dilute phase does not increase above the temperature at which entrained catalyst will be deactivated (e.g. to about 1450° F).

In the present invention, the dilute phase comprising spent regeneration gas and catalyst, having carbon monoxide essentially completely burned to carbon dioxide, exits said dilute phase regeneration zone into a catalyst-gas separation zone wherein spent regeneration gas is essentially completely separated from said entrained catalyst. From said separation zone spent regeneration gas is removed from the regeneration zone as a flue gas. Separated catalyst, at regeneration temperature in the range of 1150°-1450° F, from the bottom of said separation zone is returned to said first regeneration zone. In said first regeneration zone said hot regenerated catalyst is intimately mixed with spent catalyst and primary regeneration gas for increasing the temperature thereof such that combustion of coke on spent catalyst is enhanced.

Thus, having described herein the method of the present invention, it is to be understood that no undue restriction be imposed by reason thereof, and that only such limitations are to be imposed as are contained in the appended claims.

We claim:

1. In a fluidized catalytic cracking process wherein a hydrocarbon charge is cracked, in a reaction zone, in the presence of hot, regenerated cracking catalyst, for conversion of the hydrocarbon charge into lower boiling hydrocarbon product, wherein catalyst, spent by the accumulation of coke thereon is separated from the hydrocarbon product at a temperature in the range of about 750°-1100° F, and wherein the spent catalyst is regenerated, in a regeneration zone, by burning coke therefrom; the improvement which comprises:
   a. charging spent catalyst substantially vertically downward into a vertical, cylindrical lower regeneration zone;
   b. charging an oxygen containing primary regeneration gas, under turbulent flow conditions, at a flow rate sufficient to provide about 25 to 40 percent of the stoichiometric amount of oxygen required for combusting the coke on spent catalyst to carbon dioxide and water, for forming an intimate mixture of spent catalyst and primary regeneration gas;
   c. flowing the catalyst-primary regeneration gas mixture upward through said lower regeneration zone at a superficial vapor velocity in the range of about 4.5–8 ft/sec, and a catalyst residence time in the range of about 1.0 seconds to 1 minute into the bottom of a vertical, cylindrical upper regeneration zone for catalyst regeneration;
   d. radially distributing an oxygen containing secondary regeneration gas into the bottom of the upper regeneration zone at a flow rate sufficient to provide about 60 to 85 percent of the stoichometric amount of oxygen required for combustion of the coke to carbon dioxide and water such that about 100 to 110 percent of the stoichometric amount oxygen required for combustion of coke to carbon dioxide and water is supplied to the upper and lower regeneration zone;
   e. maintaining, in said upper regeneration zone, a fluidized dense phase bed of catalyst undergoing regeneration, having an upper surface, a regeneration gas superficial vapor velocity in the range of about 2.5–6.0 ft/sec, a catalyst residence time in the range of about 3–20 minutes, a pressure at the upper surface in the range of 6–50 psig, an a temperature in the range of about 1150°–1350° F, for burning coke from the catalyst undergoing regeneration at a specific coke burning rate in the range of about 0.05 to 1.0 pounds of coke per hour per pound of catalyst;
   f. withdrawing hot regenerated catalyst from the upper portion of the fluidized dense phase catalyst bed for contact with additional hydrocarbon charge in the reaction zone;
   g. disengaging regeneration gas, comprising carbon dioxide and carbon monoxide, substantially spent in oxygen, and containing entrained catalyst from the upper surface of the fluidized dense phase catalyst bed;
   h. flowing the spent regeneration gas and entrained catalyst from the top of the upper regeneration zone into a frusto-conic transition zone wherein the spent regeneration gas superficial vapor velocity decreases from about 2.5–6 ft/sec at the bottom, to about 1.0–2.2 ft/sec at the top of the transition zone, wherein a major portion of the entrained catalyst disengages the spent regeneration gas and returns to the fluidized dense phase bed under the influence of gravity, and wherein a dilute phase of catalyst suspended in spent regeneration gas is formed;
   i. flowing the dilute phase from the top of the transition zone into the bottom of a cylindrical dilute phase regeneration zone at a superficial vapor velocity in the range of about 1.0–2.0 ft/sec and a temperature in the range of about 1150° to 1450° F;
   j. separating, in a separation zone, the dilute phase into a catalyst phase and spent regeneration gas phase essentially free of entrained catalyst;
   k. transferring the separated catalyst from the separation zone to the lower regeneration zone for contact with additional spent catalyst and primary regeneration gas; and
   l. venting the spent regeneration gas essentially free of entrained catalyst from the separation zone as a flue gas.

2. The method of claim 1 wherein primary regeneration gas is charged radially into the lower regeneration zone from a plurality of openings in a primary regeneration gas distributor in a downward direction at an angle in the range of about 30° to 60° from horizontal at an exit velocity from the primary regeneration gas distributor in the range of about 65–175 ft/sec for intimately mixing primary regeneration gas and spent catalyst under turbulent flow conditions.

3. The method of claim 2 wherein secondary regeneration gas is charged radially into the upper regeneration zone from a plurality of openings in a secondary regeneration gas distributor in a downward direction at an angle in the range of about 30° to 60° from horizontal at an exit velocity from the secondary regeneration gas distributor in the range of about 65-175 ft/sec for dispersing secondary regeneration gas into the bottom of the fluidized dense phase bed.

4. The method of claim 3 wherein oxygen supplied with primary and secondary regeneration gas, regeneration pressure, fluidized dense phase temperature, and catalyst residence time in the fluidized dense phase bed are adjusted within their respective ranges for reducing residual carbon on regenerated catalyst to about 0.1 weight percent or less.

5. The method of claim 4 wherein regenerated catalyst is withdrawn from the fluidized dense phase bed into a catalyst standpipe deaeration zone external of the upper regeneration zone wherein the regenerated catalyst is deaerated forming a bed of hot, deaerated, regenerated catalyt superimposed by deaerated gas and wherein the deaerated gas is transferred from the standpipe deaeration zone to the dilute phase regeneration zone.

6. The method of claim 5 wherein the spent regeneration gas disengaging the fluidized dense phase catalyst bed contains a substantial amount of carbon monoxide, wherein combustion of carbon monoxide occurs in the transition zone wherein a substantial amount of the heat of carbon monoxide combustion is absorbed by entrained catalyst in the transition zone, and wherein a major portion of such absorbed heat is transferred to the fluidized dense phase catalyst bed with disengaged catalyst returning thereto under the influence of gravity.

7. The method of claim 6 wherein primary and secondary regeneration gas flow rates are adjusted within their respective ranges for providing sufficient oxygen for substantially complete combustion of carbon monoxide.

8. The method of claim 7 wherein carbon monoxide content of the flue gas is about 200 ppmw or less.

9. The method of claim 8 wherein residual carbon on regenerated catalyst is about 0.05 weight percent or less.

* * * * *